3,166,957
METHOD OF MANUFACTURING CUTTING PLATES
Louw Arjen Biesma, Drachten, Netherlands, assignor to North American Philips Company, Inc., New York, N.Y., a corporation of Delaware
Filed Nov. 21, 1962, Ser. No. 239,240
Claims priority, application Netherlands, Nov. 27, 1961, 271,866
4 Claims. (Cl. 76—104)

The invention relates to a method of manufacturing a cutting plate, in particular for a hair-clipper, in which the cutting plate is trough-shaped and teeth are provided in the edges of the trough.

In itself, a trough-shaped cutting plate for a shaving apparatus is known, in which, however, the upright trough edges continue inwardly with a thickness larger than the wall thickness, so that part of the trough space is covered by the inwardly projecting tooth series, the end faces of which are free, while the sides of these teeth are provided with cutting edges.

The manufacture of such a cutting plate requires cumbersome milling operations. The object of the invention therefore, is to overcome this drawback and the invention is characterized in that the longitudinal sides of a flat piece of sheet metal of even thickness are cut off along the plane in which the cutting edges of the teeth of the knife become located, that in the said longitudinal edges teeth are cut and that the edges are folded with respect to the main plane of the cutting plate until the position is reached in which the longitudinal sides are located in the desired cutting plane.

As a result of this, a strong series of teeth are obtained in the cutting plate in a particularly simple manner, while also the grinding is particularly simple because the end faces which form the knife edges can be ground in one plane.

In addition, because in a favorable embodiment sheet metal of even thickness is used as the starting material, the tooth series can be obtained by stamping the required notches out of the flat plate. Then the edges in which the teeth are provided are folded over and ground flat.

In this manner, a considerable saving of cost is obtained in mass manufacture. The teeth are short, which stands in relation with the conditions for stamping and as a result of this these teeth are very rigid.

In order that the invention may be readily carried into effect, one embodiment thereof will now be described more fully, by way of example, with reference to the accompanying drawing, in which.

The body of the knife 1 consists of sheet material having an even thickness corresponding to the lengthwise dimension of the cutting edge of a tooth. The plate has two folded edges 2, in which the teeth 3 are formed by providing notches 4 in it.

Figure 3:
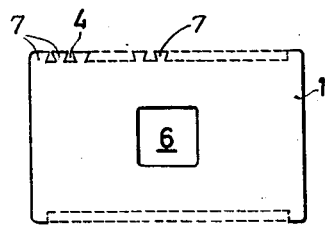
FIG. 3 shows a top plan view of the cutting plate in its first stage of manufacture.

In the manufacture, the flat metal plate as shown in FIG. 3 is used as the starting material, in which first the teeth 3 are formed by stamping the notches 4 in it. At the same time, the required slots and holes 5, 6 may be provided in the body 1. Then the edges 2 are folded and the teeth are ground flat in a plane parallel to the body of the knife 1.

FIG. 3 shows that the teeth as indicated by 7 may, if desired, also be stamped in the manner of a dovetail, so that sharper edges are formed.

The favourable conditions under which the stamping of the teeth may be carried out are those in which the dimensions of each tooth in three axial directions are approximately equal to one another. This means that, as far as the order of magnitude is concerned, the width 8 of the tooth is approximately equal to the width of the notch 8 and the length of the tooth 9 and the thickness of the plate 10. In the case of a series of teeth, as shown in the figure, also the width of the notches will usually be chosen to be approximately equal to the thickness of the plate 10.

Figure 1:
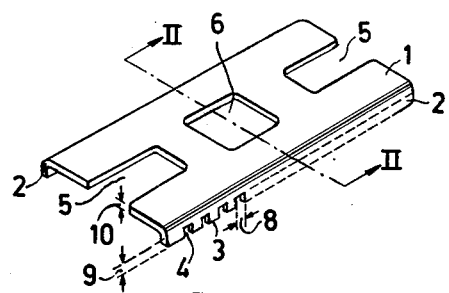
FIG. 1 is a perspective view of a cutting plate manufactured according to the invention.
Figure 2:
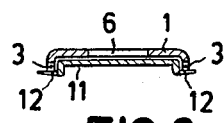
FIG. 2 shows a cross-sectional view of the movable cutter together with a fixed cutting plate.

FIG. 2 shows the co-operation with a fixed cutting plate 11, the teeth 12 of which are formed in normal manner.

What is claimed is:

1. A method of manufacturing a cutting plate in which the cutting plate is shaped in the form of a trough and teeth are provided in the edges of the trough, comprising cutting off the longitudinal sides of a flat piece of sheet metal of even thickness along the plane in which the cutting sides of the teeth of the cutting plate are located, cutting teeth in the said longitudinal edges and folding over the edges with respect to the main plane of the cutting plate until the longitudinal sides are located in the desired cutting plane at substantially right angles to said cutting plate, and grinding flat the end faces of said bent-over cutting teeth in one plane.

2. A method as claimed in claim 1, wherein the teeth are cut by stamping from the flat plate.

3. A method of manufacturing a cutting plate as claimed in claim 1 wherein the width of each tooth is substantially equal to length of the tooth and the thickness of the cutting plate.

4. A method of manufacturing a cutting plate in which the cutting plate is shaped in the form of a trough and teeth are provided in the edges of the trough comprising cutting off the longitudinal sides of a flat piece of sheet of even thickness along the plane in which the cutting sides of the teeth of the cutting plate are located, cutting teeth in said longitudinal edges, each in the form of a dovetail, and folding over the edges with respect to the main plane of the cutting plate until the longitudinal sides are located in the desired cutting plane at substantially right angles to said cutting plate, and grinding flat the end faces of said bent-over cutting teeth in one plane.

References Cited in the file of this patent

UNITED STATES PATENTS

| 1,728,192 | Wellington | Sept. 17, 1929 |
| 2,024,915 | Dufty | Dec. 17, 1935 |
| 2,308,223 | Wright | Jan. 12, 1943 |
| 2,346,489 | Horrer | Apr. 11, 1944 |
| 2,423,177 | Cunliffe | July 1, 1947 |

FOREIGN PATENTS

| 568,694 | Great Britain | Apr. 17, 1945 |